United States Patent [19]

Goto et al.

[11] Patent Number: 5,215,833

[45] Date of Patent: Jun. 1, 1993

[54] MAGNETIC RECORDING MEDIUM

[75] Inventors: Narito Goto; Katsuyuki Takeda; Kunitsuna Sasaki; Nobuyuki Sekiguchi, all of Hachioji, Japan

[73] Assignee: Konica Corporation, Tokyo, Japan

[21] Appl. No.: 718,025

[22] Filed: Jun. 20, 1991

[30] Foreign Application Priority Data

Jun. 20, 1990 [JP] Japan .................... 2-161525

[51] Int. Cl.$^5$ .................... G11B 5/66; G11B 5/72; B32B 5/16

[52] U.S. Cl. .................... 428/694; 428/323; 428/328; 428/329; 428/336; 428/408; 428/900

[58] Field of Search ............... 428/323, 336, 408, 694, 428/900, 328, 329, 695

[56] References Cited

U.S. PATENT DOCUMENTS

| | | |
|---|---|---|
| 4,956,220 | 9/1990 | Sueyoshi et al. .................... 428/900 |
| 4,992,330 | 2/1991 | Kawahara et al. .................... 428/694 |
| 5,001,006 | 3/1991 | Saito et al. .................... 428/694 |
| 5,026,598 | 6/1991 | Koyama et al. .................... 428/694 |
| 5,035,856 | 7/1991 | Koyama et al. .................... 428/900 |

Primary Examiner—Paul J. Thibodeau
Assistant Examiner—Leszek Kiliman
Attorney, Agent, or Firm—Jordan B. Bierman

[57] ABSTRACT

A magnetic recording medium is disclosed. The medium comprises a non-magnetic support and, provided thereon, plural magnetic layers comprising the uppermost magnetic layer having a thickness of 1.5 μm or less and lower magnetic layers, said plural magnetic layers containing a ferromagnetic powder, a binder and a lubricant, wherein a dynamic friction coefficient of the uppermost layer against a metal pin is 0.25 or less under the condition of a temperature of 20° C. and a relative humidity of 60%, and 0.20 or less under the condition of a temperature of 40° C. and a relative humidity of 20%.

14 Claims, 1 Drawing Sheet

MAGNETIC RECORDING MEDIUM

FIELD OF THE INVENTION

The present invention relates to a magnetic recording medium, particularly to a magnetic recording medium less in drop-out and heat roll stain and improved in running durability.

BACKGROUND OF THE INVENTION

There has been known a technique to decrease the dynamic friction coefficient of a magnetic layer as a measure to improve physical properties of video tapes and audio tapes. But it was difficult in general to decrease the dynamic friction coefficient under conditions of normal temperature & normal humidity or high temperature & low humidity. Even when a large amount of a lubricant is added to the magnetic layer for this purpose, it only deteriorates physical properties of a magnetic recording medium and impairs running durability.

Especially, when a fatty acid is added as lubricant in a magnetic layer containing ferromagnetic metal powder, the dynamic friction coefficient of the magnetic layer is difficult to be lowered because of fatty acid's liability to be adsorbed by ferromagnetic powder, and thereby problems arise such as roller stains in calendering, increased drop out (D/O) and deterioration in running durability.

To improve the above state, the present invention is accomplished.

SUMMARY OF THE INVENTION

The object of the present invention is to provide a magnetic recording medium low in drop-out and heat roll stain as well as high in running durability, by dividing the magnetic layer on a non-magnetic support into plural layers and by specifying the dynamic friction coefficient of said magnetic layers.

The present invention to achieve the above object comprises a magnetic recording medium comprising a non-magnetic support and, provided thereon, plural magnetic layers comprising the uppermost magnetic layer having a thickness of 1.5 μm or less and lower magnetic layers, said plural magnetic layers containing a ferromagnetic powder, a binder and a lubricant, wherein a dynamic friction coefficient of the uppermost layer against a metal pin is 0.25 or less under the condition of a temperature of 20° C. and a relative humidity of 60%, and 0.20 or less under the condition of a temperature of 40° C. and a relative humidity of 20%.

DETAILED DESCRIPTION OF THE INVENTION

Layer structure

The magnetic recording medium of the invention is composed basically of plural magnetic layers, namely two or more layers, laminated on the surface of a support.

Figure 1:
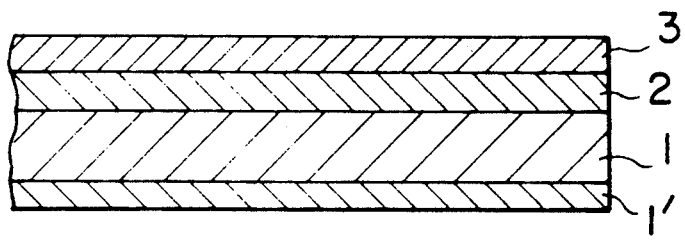
FIG. 1 is a sectional view showing an example of the magnetic recording medium according to the invention.

In case the magnetic layer has a bi-layer structure, the magnetic recording medium of the invention is formed, for example, by laminating, on non-magnetic support 1, the magnetic layer consisting of lower layer 2 and upper layer (corresponding to the uppermost layer) as shown in FIG. 3 (corresponding to the uppermost layer) as shown in FIG. 1.

On the reverse side of the support on which no magnetic layer is formed, back-coat layer 1' may be formed for purposes of enhancing running durability, preventing electrification, and transfer of a magnetic layer. Between the magnetic layer and the non-magnetic support, a subbing layer, for example, may be provided.

Magnetic layer

Each of the above magnetic layers basically comprises a binder dispersing in it a ferromagnetic powder.

In the invention, it is necessary that the uppermost layer's dynamic friction coefficient against the metal pin be specified according to the environment.

That is, it is essential that the dynamic friction coefficient be 0.25 or less in an environment where temperature is 20° C. and relative humidity is 60% and that the dynamic friction coefficient be 0.20 or less in an environment where temperature is 40° C. and relative humidity is 20%.

The dynamic friction coefficient mentioned here indicates the following $\mu k$, which is given through measurement with the tape running tester TBT-300D (product of Yokohama System Laboratory), by running a sample tape in a position to contact by 180° with a 4-$\phi$ chromium-plated stainless steel pin of the tester at a speed of 1.43 cm/sec under an inlet tension of 20 g, and then making a calculation with the following expression.

$$\mu k = (1/\pi)\ln(X/20)$$

where X represents an outlet tension (g).

When the magnetic recording medium of the invention meets the above conditions, a reduced drop-out and heat roll stain as well as a high running durability can be attained; however, the effect of the invention cannot be fully brought out when the dynamic friction coefficient deviates from the above limits.

That is, a dynamic friction coefficient of 0.25 or more in an environment of 20° C. and 60% RH leads to a poor running durability, and a dynamic friction coefficient of 0.20 or more at 40° C. and 20% RH results in a low running durability and tends to cause stains on calender heat rolls.

Factors having influence on the dynamic friction coefficient include an amount of a lubricant contained in the uppermost layer and the number of small projections existing on the surface of the uppermost layer.

Therefore, the following measures (a) to (g) are taken to maintain the dynamic friction coefficient within the limits specified above.

(a) The magnetic layer is subdivided into plural layers and Co-containing iron oxide is incorporated especially in a lower layer, so that the lower layer is liable to retain relatively a lubricant and the lubricant can be readily diffused in the upper layer.

(b) The magnetic layer is subdivided into plural layers and magnetic powders, whose surface are treated with Si or Al, are used especially in an upper layer to prevent the magnetic powder from adsorbing a lubricant excessively and regulate the addition amount of a lubricant appropriately.

(c) Regulation of the amount of a lubricant contained in the magnetic layer.

(d) Regulation of the amount of a filler such as carbon black contained in the magnetic layer.

(e) Regulation of the type and amount of a binder contained in the magnetic layer (since a binder may have influence on the adsorption of a lubricant).

(f) Regulation of a dispersing time for a binder, a ferromagnetic powder and a filler (since this may have influence on the adsorption of a lubricant).

(g) Regulation of thicknesses of the upper and lower layers.

Further, to enhance the effect of the invention much more, it is preferable that the uppermost layer contain a ferromagnetic metal powder as a ferromagnetic powder and have a thickness of 1.5 μm or less and preferably 0.3 to 1.0 μm.

In this case, it is preferable that a magnetic layer other than the uppermost layer contain Co-containing magnetic iron oxide as a ferromagnetic powder and that the surface of said Co-containing magnetic iron oxide be treated with Si and/or Al.

It is particularly preferable that the dynamic friction coefficient be 0.17 or less under an environment of 40° C. and 20% RH, and 0.22 or less under an environment of 20° C. and 60% RH. When this condition is satisfied, the effect of the invention is brought out most effectively.

Ferromagnetic powder

As ferromagnetic powder used in the invention, there may be employed conventional ones known in the area of magnetic recording media.

Useful examples include oxide magnetic materials such as $\gamma\text{-}Fe_2O_3$, Co-containing $\gamma\text{-}Fe_2O_3$, Co-coated $\gamma\text{-}Fe_2O_3$, $Fe_3O_4$, Co-containing $Fe_3O_4$, Co-coated $Fe_3O_4$, Co-containing magnetic $FeO_x$ ($4/3 < x < 3/2$) and $CrO_2$.

Further, hexagonal ferrite such as barium ferrite, and iron nitride are also usable.

As described above, it is preferable that among the above magnetic materials, Co-containing magnetic iron oxides such as Co-containing $\gamma\text{-}Fe_2O_3$, Co-coated $\gamma\text{-}Fe_2O_3$, Co-containing $Fe_3O_4$, Co-coated $Fe_3O_4$ and Co-containing magnetic $FeO_x$ ($4/3 < x < 3/2$) be contained in a magnetic layer other than the uppermost layer.

The surface of these Co-containing iron oxides is preferably coated with Si and/or Al. And in this case, it is preferable that Si be contained in an amount of 0.1 to 3.0 wt% and Al 0.01 to 1.0 wt%.

On the other hand, preferable examples of the ferromagnetic metal powder used in the uppermost layer include those ferromagnetic metal powders of which respective main components are Fe, Co, Fe-Al, Fe-Al-Ca, Fe-Al-Ni, Fe-Al-Zn, Fe-Al-Co, Fe-Al-Ca, Fe-Ni, Fe-Ni-Al, Fe-Ni-Co, Fe-Ni-Si-Al-Mn, Fe-Ni-Si-Al-Zn, Fe-Al-Si, Fe-Al-Co, Fe-Ni-Zn, Fe-Ni-Mn, Fe-Ni-Si, Fe-Mn-Zn, Fe-Co-Ni-P or Ni-Co.

Among them, Fe containing metal powders are excellent in electrical characteristics.

On the contrary, preferable ones from viewpoints of corrosion resistance and dispersibility are Fe containing metal powders such as Fe-Al type, Fe-Al-Ca type, Fe-Al-Ni type, Fe-Al-Zn type, Fe-Al-Co type, Fe-Ni type, Fe-Ni-Zn type, Fe-Ni-Si-Al-Zn type, Fe-Ni-Si-Al-Mn type and Fe-Ni-Co type.

More preferable ferromagnetic metal powders are those which contain mainly iron and contain Fe and Al in weight ratios of Fe:Al=100:0.5 to 100:20 and Fe:Ca=100:0.1 to 100:10.

Also, usable ferromagnetic metal powders are those containing at least one kind of Zn atoms and Mn atoms in addition to Fe atoms, Ni atoms, Al atoms and Si atoms; having a Fe-atom content of 90 atom% or more, Ni-atom content of 1 atom% or more and 10 atom% or less, Al-atom content of 0.1 atom% or more and 5 atom% or less, Si-atom content of 0.1 atom% or more and 5 atom% or less, Zn-atom content and/or Mn-atom content (when both Zn atoms and Mn atoms are contained, the total amount is used) of 0.1 atom% or more and 5 atom% or less; and having a Fe atoms:Ni atoms:Al atoms:Si atoms:Zn atoms and/or Mn atoms ratio (in the number of atoms) of 100:(4 or less):(10 to 60):(10 to 70):(20 to 80) in the peripheral region at an ESCA's analytical depth of 100 Å or less.

As a ferromagnetic powder used in the invention, a ferromagnetic powder having a coercive force (Hc) of 600 to 5,000 Oe is generally preferred.

In the invention, it is preferable that the saturation magnetic quantity ($\sigma s$) of the ferromagnetic powder be usually 70 emu/g or more.

In the invention, ferromagnetic powders having a specific surface area of 45 m$^2$/g to 80 m$^2$/g according to the BET method are preferred in view of the increasing demand for a high-density recording.

The specific surface area of the ferromagnetic powder of the invention is given in square meters per gram by a specific surface area measured according to a specific surface measuring method called the BET method.

This specific surface area and the measuring method thereof are described in detail in "Measurement of Fine Particles" written by J.M. Dallavelle, Clyeorr Jr., translated by Muta et al., published by Sangyo Tosho; these can be also seen in "Chemical Handbook" Application Vol., pp.1170–1171, edited by Japan Chemical Society, published by Maruzen (1966).

Measurement of the specific surface area is made, for example, by steps of degassing a sample powder to remove adsorbed matters through heating for 13 minutes at approximately 105° C., introducing the powder into a measuring apparatus, setting the initial nitrogen pressure at 0.5 kg/m$^2$, and then carrying out measurement for 10 minutes at the liquid nitrogen temperature ($-105°$ C.).

The Quantasorb (product of Yuasa Ionix), for example, can be used as a measuring apparatus.

Binder

Typical binders used in the invention are polyurethane, polyester and vinyl chloride type resin such as vinyl chloride copolymer. These resins preferably contain a repeated unit having at least one polar group selected from the group consisting of —SO$_3$M, —OSO$_3$M, —COOM and —PO(OM$^1$)$_2$.

In the above polar groups, M is a hydrogen atom, an alkali metal such as Na, K or Li or ammonium; and M' is a hydrogen atom, an alkali metal such as Na, K or Li, or an alkyl group.

The above polar groups have a capability of enhancing the dispersibility of ferromagnetic powder, and the content of these groups in the resin is 0.1 to 8.0 mol%, and preferably 0.5 to 6.0 mol%.

The weight-average molecular weight of these resins is preferably within the range of 15,000 to 50,000.

The binder content of the magnetic layer is normally 10 to 40 parts, and preferably 15 to 30 parts by weight per 100 parts by weight of ferromagnetic powder.

The binder may be used not only singly, but also in combination. When combined, the weight ratio of polyurethane and/or polyester to vinyl chloride type resin is normally 90:10 to 10:90 and preferably 70:30 to 30:70.

The polar-group-containing vinyl chloride resin used in the invention as a binder can be synthesized, for example, by addition reaction between a hydroxyl-group-containing copolymer such as vinyl chloride-vinyl alcohol copolymer and the following compound having a polar group and chlorine atom.

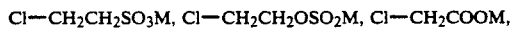
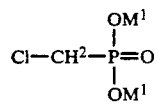

When $ClCH_2CH_2SO_3Na$ is taken as an example, the reaction proceeds as follows:

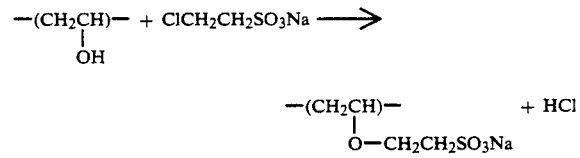

Further, the polar-group-containing vinyl chloride type copolymer can be also prepared by placing in an autoclave a prescribed amount of a reactive monomer having a unsaturated-bond and polar-group-containing repetitive units, and then polymerizing the monomer using a conventional polymerization initiator such as radical polymerization initiator (e.g., benzoyl peroxide, azobisisobutylonitrile), redox lopymerization initiator or cationic polymerization initiator.

Examples of the reactive monomer to introduce a sulfonic acid or salt thereof include unsaturated hydrocarbon sulfonic acids such as vinylsulfonic acid, allylsulfonic acid, methacrylsulfonic acid, p-styrenesulfonic acid; and salts thereof.

(Meth)acrylic acid or maleic acid, for example, is used to introduce a carboxylic acid or salt thereof; (meth)acrylic acid-2-phosphate, for example, is used to introduce a phospholic acid or salt thereof.

It is preferable that epoxy and hydroxy groups be introduced into the vinyl chloride type copolymer, since the heat stability of the polymer is improved by means of such a measure.

When epoxy groups are introduced, the content of epoxy-group-containing repetitive unit in the copolymer is 1 to 30 mol% and preferably 1 to 20 mol%.

As a monomer to introduce epoxy groups, glycidyl methacrylate, for example, is preferably used.

The technique to introduce polar groups into a vinyl chloride type copolymer is described in Japanese Patent O.P.I. Publication Nos. 44227/1982, 108052/1983, 8127/1984, 101161/1985, 235814/1985, 238306/1985, 238371/1985, 121923/1987, 146432/1987, 146433/1987, which can be used in the invention.

Next, syntheses of the polyester and the polyurethane used in the invention are described.

In general, polyester is prepared by the reaction between polyols and polybasic acids.

Utilizing this known method, the polar-group-containing polyester (polyol) can be prepared from polyols and polybasic acids containing partially those having a polar group.

Examples of the polar-group-containing polybasic acid include 5-sulfoisophthalic acid, 2-sulfoisophthalic acid, 4-sulfoisophthalic acid, 3-sulfophthlic acid, 5-sulfoisophthalic acid dialkyl, 2-sulfoisophthalic acid dialkyl, 4-sulfoisophthalic acid dialkyl, 3-sulfoisophthalic acid dialkyl, and sodium and potassium salts thereof.

Examples of the polyol include trimethylolpropane, hexanetriol, glycerine, trimethylolethane, neopentyl glycol, pentaerythritol, ethylene glycol, propylene glycol, 1,3-butanediol, 1,4-butanediol, 1,6-hexanediol, diethylene glycol and cyclohaxane dimethanol.

Polyesters having other polar groups can be also synthesized by a known method.

Next, the polyurethane is described.

This material prepared by the reaction between polyols and isocyanates.

As a polyol, polyester polyols prepared by the reaction of polyols with polybasic acids are generally used.

Therefore, use of a polar-group-containing polyester as a raw material gives a polar-group-containing polyurethane.

Examples of the polyisocyanate are diphenylmethane-4-4'-diisocyanate (MDI), hexamethylene diisocyanate (HMDI), tolylene diisocyanate (TDI), 1,5-naphthalene diisocyanate (NDI), tolidine diisocyanate (TODI) and lysine diisocyanate (LDI).

As a method of synthesizing a polar-group-containing polyurethane, reaction between a hydroxy-group-containing polyurethane and the following chlorine-containing compound is useful, too.

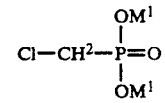

The technique to introduce a polar group into polyurethane is described in Japanese Patent Examined Publication No. 41565/1983, Japanese Patent O.P.I. Publication Nos. 92422/1982, 92423/1982, 8127/1984, 5423/1984, 5424/1984 and 121923/1987.

In the invention, there may be jointly used the following resins as a binder in an amount not more than 20% by weight of the total binder.

Such resins, which have a weight-average molecular weight of 10,000 to 200,000, include vinyl chloride-vinyl acetate copolymer, vinyl chloride-vinylidene chloride copolymer, vinyl chloride-acrylonitrile copolymer, butadiene-acrylonitrile copolymer, polyamide resin, polyvinyl butyral, cellulose derivatives (nitrocellulose, etc.), styrene-butadiene copolymer, various synthetic rubber type resins, phenol resin, epoxy resin, urea resin, melamine resin, phenoxy resin, silicone resin, acrylic resin and urea-formamide resin.

Other components

In the invention, it is preferable that polyisocyanates be contained in the magnetic layer to improve its durability.

Such polyisocyanates include, for example, aromatic polyisocyanates such as active-hydrogen-compound adducts of tolylene diisocyanate (TDI), and aliphatic polyisocyanates such as active-hydrogen-compound adducts of hexamethylene diisocyanate (HMDI).

The weight-average molecular weight of these polyisocyanates is preferably within the range of 100 to 3,000.

In the invention, there may be added in the magnetic layer, singly or in combination, additives such as dispersant, lubricant, abrasive, antistatic agent and filler according to a specific requirement.

Preferable dispersants include, for example, fatty acids having 12 to 18 carbon atoms such as caprylic acid, capric acid, lauric acid, myristic acid, palmitic acid, stearic acid and oleic acid; alkali metal salts, alkaline earth metal salts or amides thereof; polyalkylene oxide alkylphosphates; lecithin; trialkylpolyolefinoxy quaternary ammonium salts; and azo compounds containing a carboxylic group and sulfonic acid group.

These dispersants are generally used in an amount of 0.5 to 5 wt% of ferromagnetic powder.

As a lubricant, a fatty acid and/or an ester thereof are preferably used.

The addition amount of the fatty acid is generally 0.2 to 10 wt% and preferably 0.5 to 5 wt% of ferromagnetic powder.

When the addition amount is less than 0.2 wt%, the running durability is liable to be poor, and an addition amount more than 10 wt% causes fatty acids to bleed on the surface of the magnetic layer and leads to an output drop.

The addition amount of the fatty ester is generally 0.2 to 10 wt% and preferably 0.5 to 5 wt% of ferromagnetic powder.

An addition amount less than 0.2 wt% tends to lower still flame durability; an addition amount more than 10 wt% causes fatty esters to bleed on the surface of the magnetic layer, and thereby a poor running durability and output drop come out.

When a fatty acid and fatty ester are jointly used for enhancing the lubricity much more, the weight ratio of fatty acid to fatty ester is preferably 10:90 to 90:10.

Usable fatty acids may be either monobasic acids or dibasic acids, the number of carbon atoms is preferably in the range of 6 to 30 and especially in the range of 12 to 22.

Examples of the fatty acid include caproic acid, caprylic acid, capric acid, lauric acid, myristic acid, palmitic acid, stearic acid, isostearic acid, linolenic acid, oleic acid, elaidic acid, behenic acid, malonic acid, succinic acid, glutaric acid, adipic acid, pimelic acid, azelaic acid, sebacic acid, 1,12-dodecane dicarboxylic acid and octane dicarboxylic acid.

Examples of the fatty ester include oleyl oleate, isocetyl stearate, dioleyl malonate, butyl stearate, butyl palmitate, butyl myristate, octyl myristate, octyl palmitate, pentyl stearate, pentyl palmitate, isobutyl oleate, stearyl stearate, lauryl oleate, octyl oleate, isobutyl oleate, ethyl oleate, isotridecyl oleate, 2-ethylhexyl stearate, 2-ethylhexyl palmitate, isopropyl palmitate, isopropyl myristate, butyl laurate, cetyl 2-ethylhexalate, dioleyl adipate, diethyl adipate, diisobutyl adipate, diisodecyl adipate, oleyl stearate, 2-etylhexyl myristate, isopentyl palmitate, isopentyl stearate, diethylene glycol-monobutylether palmitate and diethylene glycol-monobutylether palmitate.

Further, other than the above fatty acids and fatty esters, there may be used, as lubricant, silicone oils, graphite, carbon fluorides, molybdenum disulfide, tungsten disulfide, fatty amides, $\alpha$-olefin oxides.

Examples of the abrasive are $\alpha$-alumina, fused alumina, chromium oxide, titanium oxide, $\alpha$-iron oxide, zirconium oxide, silicon oxide, silicon nitride, tungsten carbide, molybdenum carbide, boron carbide, corundum, zinc oxide, cerium oxide, magnesium oxide and boron nitride.

The average particle size of the abrasive is generally 0.05 to 0.6 $\mu$m and preferably 0.1 to 0.3 $\mu$m.

Usable antistatic agents include conductive powders such as carbon black, graphite; cationic surfactants such as quaternary ammonium salts; anionic surfactants containing acid groups such as sulfonic acid, sulfuric acid, phosphoric acid, phosphates, carboxylic acid; amphoteric surfactants such as aminosulfonic acid; and natural surfactants such as saponin.

The above antistatic agents are used in an amount of 0.01 to 40 wt% of binder.

Non-magnetic support

As materials to form the above non-magnetic support, there can be used, for example, polyesters such as polyethylene terephthalate, polyethylene-2,6-naphthalate; polyolefins such as polypropylene; cellulose derivatives such as cellulose triacetate, cellulose diacetate; and other plastics such as polyamide, polycarbonate.

The shape of the above non-magnetic support is not particularly limited, and the mainly used are tapes, films, sheets, cards, discs and drums.

There is no particular restriction on the thickness of the non-magnetic support. It is normally 3 to 100 $\mu$m, preferably 5 to 50 $\mu$m for films and sheets, 30 $\mu$m to 10 mm for discs and cards; in case of drums, the thickness is appropriately selected according to the type of recorder and the like.

The non-magnetic support may be of monolayer configuration or multilayer configuration.

Further, the non-magnetic support may be subjected to surface treatment such as corona discharge for an improved adhesion.

Manufacture of magnetic recording medium

The magnetic recording medium of the invention has no particular restriction on the method to be manufactured, it can be manufactured according to a conventional method of manufacturing multilayer-configurational magnetic recording media.

In general, it is manufactured by steps of kneading and dispersing a magnetic powder, binder, dispersant, lubricant, abrasive and antistatic agent in a solvent to prepare a magnetic coating, and then coating the magnetic coating on a non-magnetic support.

Useful solvents include, for example, ketones such as acetone, methyl ethyl ketone (MEK), methyl isobutyl ketone (MIBK), cyclohexanone; alcohols such as methanol, ethanol, propanol; esters such as methyl acetate, ethyl acetate, butyl acetate; cyclic ethers such as tetrahydrofuran; and chlorinated hydrocarbons such as methylene chloride, ethylene chloride, carbon tetrachloride, chloroform and dichlorobenzene.

In kneading and dispersing the magnetic layer components, there can be used various kneaders and dispersers, such as two-roll mill, three-roll mill, ball mill, pebble mill, co-ball mill, Tron mill, sand mill, sand grinder, Sqegvari attriter, high-speed stone mill, high-speed impact mill, disperser, high-speed mixer, homogenizer, supersonic disperser, open kneader, continuous kneader and pressurized kneader.

Among these kneaders and dispersers, preferred ones are pressurized kneader, open kneader, continuous kneader, two-roll mill and three-roll mill, in view of their capabilities of providing a power demand load of 0.05 to 0.5 KW (per kg of magnetic powder).

The coating method to form a magnetic layer on a non-magnetic support includes air doctor coating, air knife coating, blade coating, aqueeze coating, impregnation coating, transfer coating, reverse coating, kiss coating, gravure coating, cast coating, extrusion coating and spray coating.

In the invention, which is characterized by the multiple magnetic layer configuration having a specific dynamic friction coefficient, coating is carried out in either a wet-on-wet mode or wet-on-dry mode to provide plural magnetic layers. Of the two coating modes, the former is preferred for its capability of reducing the manufacturing process.

In general, the magnetic layer formed on a non-magnetic support is dried, while being subjected to magnetic orientation treatment.

Then, the magnetic layer is calendered to smooth the surface.

The magnetic recording medium prepared as above is subjected to burnishing or blading when necessary, and then slitted.

Figure 2:
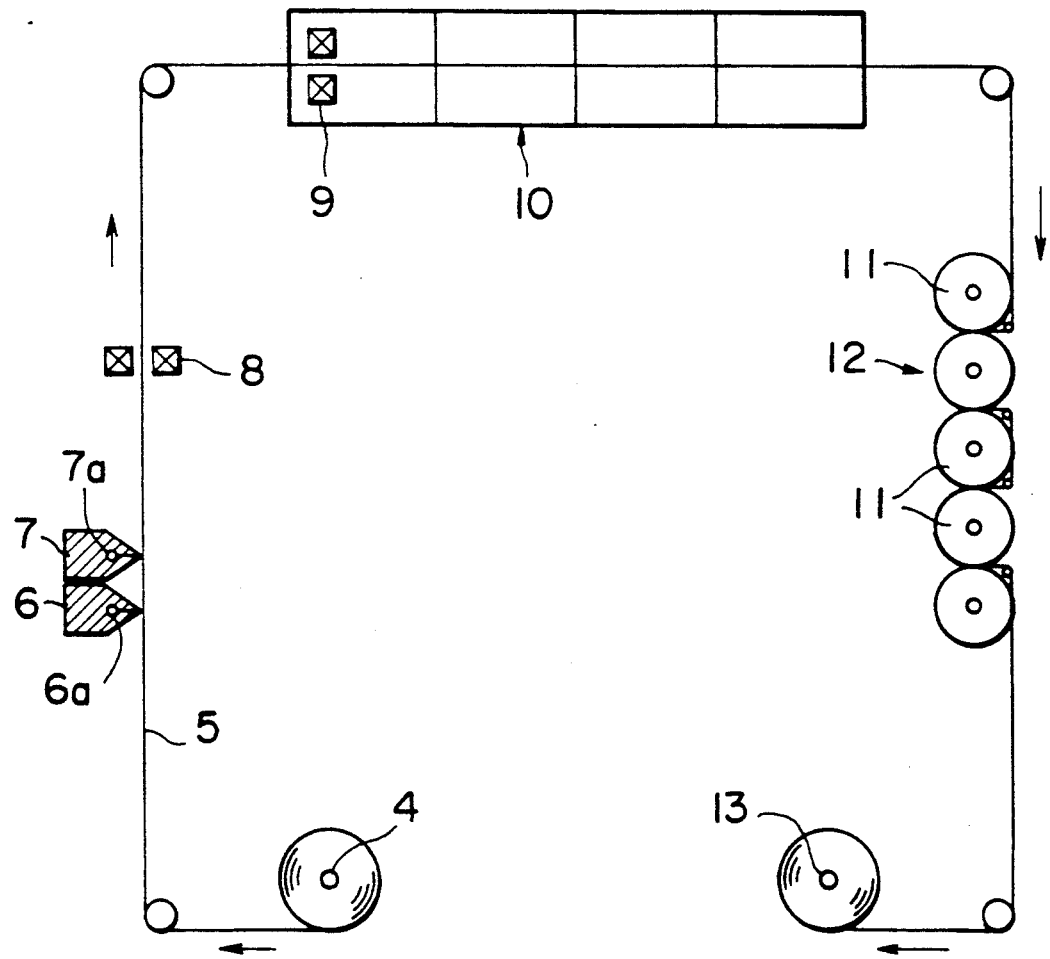
FIG. 2 is a flow chart showing an example of manufacturing process for a magnetic recording medium, where 1: non-magnetic support, 2: lower layer, 3: upper layer, 4: feed roll, 5: non-magnetic support, 6 and 7: coaters, 8 preorientation magnet, 9 post-orientation magnet, 10 drying zone, 11 calender roll, 12 supercalendering

An example of the above processes is shown in FIG. 2, where non-magnetic film support 5 fed by feed roll 4 is simultaneously coated with a paint for lower layer and that for upper layer by extrusion coaters 6 and 7 (having reservoirs 6a and 7a, respectively) in the wet-on-wet mode, and then introduced via pre-orientation magnet 8 into drying zone 10 equipped with post-orientation magnet 9 and dried by hot air blown from nozzles arranged up and down, non-magnetic support 5 having dried magnetic layers is introduced into supercalendering equipment 12 composed of calender roll 11, calendered here, and then wound by take-up roll 13.

The web obtained as above is cut into desired shapes and sizes to obtain magnetic recording media.

EXAMPLES

The present invention is hereunder described in more detail with the examples and comparisons. In the description below, "part" means "part by weight".

Example 1

A magnetic coating for the upper layer was prepared by kneading and dispersing the following magnetic composition for the upper layer.

| Magnetic composition for the upper layer | |
|---|---|
| Fe—Al type ferromagnetic metal powder (Hc: 1580 Oe, σs: 120 emu/g, BET value: 55 m²/g Fe:Al = 100:10) | 100 parts |
| Potassium-sulfonate-containing vinyl chloride type resin (tradename: MR110, product of Nippon Zeon) | 10 parts |
| Sodium-sulfonate-containing polyurethane | 5 parts |
| Alumina (average particle size: 0.2 μm) | 5 parts |

| Magnetic composition for the upper layer -continued | |
|---|---|
| Carbon black | 1 part |
| Stearic acid | 1 part |
| Butyl stearate | 1 part |
| Cyclohexanone | 100 parts |
| Methyl ethyl ketone | 100 parts |
| Toluene | 100 parts |

A magnetic coating for the lower layer was prepared with the same composition as that of the above magnetic coating for the upper layer, except that the ferromagnetic powder was replaced by Co-γ-Fe$_2$O$_3$ powder (Hc: 800 Oe, BET value: 50 m²/g, containing 0.8 wt% of Si and 0.1 wt% of Al).

After 5 part of polyisocyanate (Coronate L, Product of Nippon Polyurethane) to the magnetic coating for the upper layer and that for the lower layer and the coatings were coated on a 10-μm-thick polyethylene terephthalate film in the wet-on-wet mode, the coated film was then subjected to magnetic orientation while wet. After being dried, it was subjected to surface smoothing treatment on the calender; thus, a magnetic layer having a 2.5-μm-thick lower layer and 0.5-μm-thick upper layer was formed.

Next, a backcoating paint having the following composition was coated on the above polyethylene terephthalate film oppositely with the magnetic layer so as to form a backcoat layer having a dry thickness of 0.8 μm

| Backcoating paint | |
|---|---|
| Carbon black (Raven 1035) | 40 parts |
| Barium sulfate (average particle size: 300 mμ) | 10 parts |
| Nitrocellulose | 25 parts |
| Polyurethane (tradename: N-2301, product of Nippon Polyurethane) | 25 parts |
| Polyisocyanate compound (tradename: Coronate L, product of Nippon Polyurethane) | 10 parts |
| Cyclohexane | 400 parts |
| Methyl ethyl ketone | 250 parts |
| Toluene | 250 parts |

The web obtained as above was slitted into tapes of 8 mm wide to prepare video tapes.

The upper layer of the video tape had a dynamic friction coefficient (μk) of 0.18 at 20° C., 60% RH and that of 0.12 at 40° C., 20% RH.

The video tape was evaluated for the drop-out, staining of calender heat roll and running property in the following manners.

The results are shown in Table 1.

Drop-out (D/O):

The number of drop-outs causing an output drop of —12 dB or more for 5 μs and that for 15 μs or more was measured with the 8 mm Video Movie V-900 (product of Sony).

Staining of calender heat roll:

During the manufacturing process of the above web, staining of the calender roll was visually checked. Rating is as follows:

⊚: no stain
○: scarcely staining
Δ: slightly staining
X: staining

Running property

The video tape was subjected to full length running of 50 passes under two conditions of 20° C., 60% RH and 40° C., 20%, respectively, and then visually checked for edge damage.
Rating is as follows:
○: no edge folding
Δ: partial edge folding
X: overall edge folding Examples 2 to 8, Comparisons 1 to 6

Video tapes were prepared in the same manner as in Example 1, except that the ferromagnetic powders used in the magnetic composition for the lower layer and that for the upper layer in Example 1 were changed to those shown in Table 1, and that the dynamic friction coefficient of the upper layer as well as thicknesses of the upper and lower layers were change to those shown in Table 1.

Hc: 700 Oe, BET value: 30 m$^2$/g, treating amount of Si: 0.5 wt%, and treating amount of Al: 0.05 wt%.

The characteristics of Co-containing iron oxide used in Comparison 4 were, Hc: 800 Oe and BET value: 50 m$^2$/g.

The characteristics of the Fe-Al type ferromagnetic powder used in the upper layer of Comparison 5 were, Hc: 1,550 Oe, $\sigma$:120 emu/g, BET value: 50 m$^2$/g, and weight ratio of Fe:Al=100:5.

The carbon content of the upper layer in Comparison 6 was 0.

The characteristics of the Fe-Al-Ca type ferromagnetic metal powder used in the upper layer of Example 8 were, Hc: 1,580 Oe, $\sigma$s:120 emu/g, BET value: 55 m$^2$/g, and weight ratio of Fe:Al:Ca=100:10:2.

The video tapes obtained were evaluated for the drop-out, staining of calender heat roll, and running property in the same manner as in Example 1.

The results of the evaluation are shown in Tables 1 and 2.

Table 1

|  | Example 1 | Example 2 | Example 3 | Example 4 | Example 5 | Example 6 | Comparison 1 | Comparison 2 | Comparison 3 | Comparison 4 |
|---|---|---|---|---|---|---|---|---|---|---|
| Ferromagnetic powder in upper layer | Fe/Al | Fe/Al | Fe/Al | Fe/Ni | Co-containing iron oxide | Fe/Al | Fe/Al | Fe/Al | Fe/Ni | Co-containing iron oxide |
| Ferromagnetic powder in lower layer | Co-containing iron oxide | Co-containing iron oxide | Co-containing iron oxide | Co-containing iron oxide | Co-containing iron oxide | Co-containing iron oxide | Co-containing iron oxide | — | — | — |
| Si content of Co-containing iron oxide in lower layer (wt %) | 0.8 | 0.5 | — | 0.8 | 0.5 | 0.8 | 0.8 | — | — | — |
| Al content of Co-containing iron oxide in lower layer (wt %) | 0.1 | 0.1 | — | 0.1 | 0.05 | 0.1 | 0.1 | — | — | — |
| Thickness of upper layer (μm) | 0.5 | 0.5 | 0.5 | 0.5 | 0.5 | 1.0 | 1.7 | 3.0 | 3.0 | 3.0 |
| Thickness of lower layer (μm) | 2.5 | 2.5 | 2.5 | 2.5 | 2.5 | 2.0 | 1.3 | — | — | — |
| μk of upper layer at 20° C., 60% RH | 0.18 | 0.20 | 0.23 | 0.15 | 0.16 | 0.19 | 0.22 | 0.22 | 0.23 | 0.21 |
| μk of upper layer at 40° C., 20% RH | 0.12 | 0.14 | 0.17 | 0.11 | 0.11 | 0.16 | 0.22 | 0.22 | 0.21 | 0.21 |
| D/O (15 μms/5 μms) | 10/25 | 20/40 | 25/70 | 11/27 | 8/17 | 30/81 | 51/135 | 55/142 | 35/95 | 45/115 |
| Staining of calender heat roll | ⊚ | ⊚ | ○ | ⊚ | ⊚ | ○ | X | X | X | X |
| Running property at 20° C., 60% RH | ○ | ○ | ○ | ○ | ○ | ○ | ○ | ○ | ○ | ○ |
| Running property at 40° C., 20% RH | ○ | ○ | ○ | ○ | ○ | ○ | Δ | Δ | Δ | Δ |

Incidentally, the Co-containing iron oxide for the lower layer used in Examples 2 to 4 and 6 to 8 and Comparison 1, 6 had a Hc of 800 Oe and BET value of 50 m$^2$/g.

The Fe-Al type ferromagnetic powder used in the upper layer of Examples 2, 3, 6, 7 and Comparisons 1, 2, 5, 6 was the same as that used in Example 1.

The characteristics of Fe-Ni type ferromagnetic powder used in Example 4 and Comparison 3 were, Hc: 1,570 Oe, $\sigma$s:122 emu/g, BET value: 56 m$^2$/g, and weight ratio of Fe:Ni=100:10.

In Example 5, the characteristics of the Co-containing iron oxide used in the upper layer were, Hc: 800 Oe, BET value: 50 m$^2$/g, treating amount of Si: 0.8 wt%, and treating amount of Al: 0.1 wt%; and those of the Co-containing iron oxide used in the lower layer were,

TABLE 2

|  | Example 7 | Example 8 | Comparison 5 | Comparison 6 |
|---|---|---|---|---|
| Ferromagnetic powder in upper layer | Fe/Al | Fe/Al/Ca | Fe/Al | Fe/Al |
| Ferromagnetic powder in lower layer | Co-containing iron oxide | Co-containing iron oxide | Fe/Al | Co-containing iron oxide |
| Si content of Co-containing iron oxide in lower layer (wt %) | 0.8 | 0.8 | — | — |
| Al content of Co-containing iron oxide in lower layer | 0.1 | 0.1 | — | — |

TABLE 2-continued

|  | Example 7 | Example 8 | Comparison 5 | Comparison 6 |
|---|---|---|---|---|
| (wt %) |  |  |  |  |
| Thickness of upper layer ($\mu$m) | 1.5 | 0.5 | 0.5 | 0.5 |
| Thickness of lower layer ($\mu$m) | 1.5 | 2.5 | 2.5 | 2.5 |
| $\mu$k of upper layer at 20° C., 60% RH | 0.21 | 0.17 | 0.21 | 0.32 |
| $\mu$k of upper layer at 40° C., 20% RH | 0.20 | 0.11 | 0.21 | 0.27 |
| D/O (15 $\mu$ms/5 $\mu$ms) | 38/91 | 7/18 | 53/137 | 63/141 |
| Staining of calender heat roll | Δ | ⊙ | X | X |
| Running property at 20° C., 60% RH | ○ | ○ | ○ | X |
| Running property at 40° C., 20% RH | ○ | ○ | Δ | X |

What is claimed is:

1. A magnetic recording medium comprising a non-magnetic support and, provided thereon, plural magnetic layers comprising the uppermost magnetic layer having a thickness of 1.5 $\mu$m or less and lower magnetic layers, said plural magnetic layers containing a ferromagnetic powder, a binder and a lubricant, wherein a dynamic friction coefficient of the uppermost layer against a metal pin is 0.25 or less under the condition of a temperature of 20° C. and a relative humidity of 60%, and 0.20 or less under the condition of a temperature of 40° C. and a relative humidity of 20%.

2. The magnetic recording medium of claim 1, wherein said plural magnetic layers comprises two magnetic layers of which a lower magnetic layer and the uppermost magnetic layer are provided on said support in that order.

3. The magnetic recording medium of claim 1, wherein said lower magnetic layer comprises a Co-containing magnetic iron oxide.

4. The magnetic recording medium of claim 1, wherein said uppermost magnetic layer contains a ferromagnetic powder comprising substantially Fe and Al.

5. The magnetic recording medium of claim 1, wherein a BET specific surface area of said ferromagnetic powder is in the range of from 45 to 80 m$^2$/g.

6. The magnetic recording medium of claim 1, wherein said binder comprises a polyurethane, polyester or vinylchloride copolymer containing in the polymer structure a repeated unit having a polar group selected from the group consisting of —SO$_3$M, —O-SO$_3$M, —COOM, and —PO(OM')$_2$, wherein M represents a hydrogen atom, Na, K, Li, or ammonium, and M' represents a hydrogen atom, Na, K, Li or an alkyl group.

7. The magnetic recording medium of claim 1, wherein the binder content of said plural magnetic layers is 10 to 40 parts by weight per 100 parts by weight of the ferromagnetic powder.

8. The magnetic recording medium of claim 1, wherein the content of said fatty acid or ester thereof in said plural magnetic layers is 0.2 to 10 weight% of the ferromagnetic powder.

9. The magnetic recording medium of claim 3, wherein said Co-containing magnetic iron oxide is treated with Si and Al.

10. The magnetic recording medium of claim 4, wherein the weight ratio of said Fe and Al is 100 : 0.5 to 100 : 20.

11. The magnetic recording medium of claim 6, wherein the content of said polar group in said polymer structure is within a range of 0.1 to 8.0 mol%.

12. The magnetic recording medium of claim 6, wherein the content of said polar group in said polymer structure is within a range of 0.5 to 6.0 mol%.

13. The magnetic recording medium of claim 7, wherein said lubricant includes a fatty acid or an ester thereof.

14. The magnetic recording medium of claim 9, wherein said Co-containing magnetic iron oxide contains Si in an amount of 0.1 to 3.0 wt% and Al in an amount of 0.01 to 1.0 wt%.

* * * * *